Sept. 15, 1936.   R. M. BURNETT   2,054,651
HAND BRAKE MECHANISM
Filed May 14, 1926   5 Sheets-Sheet 2
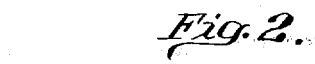
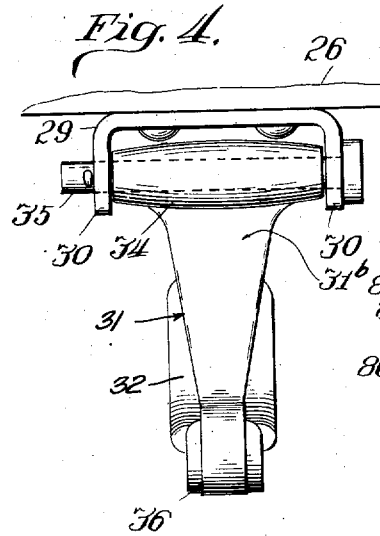
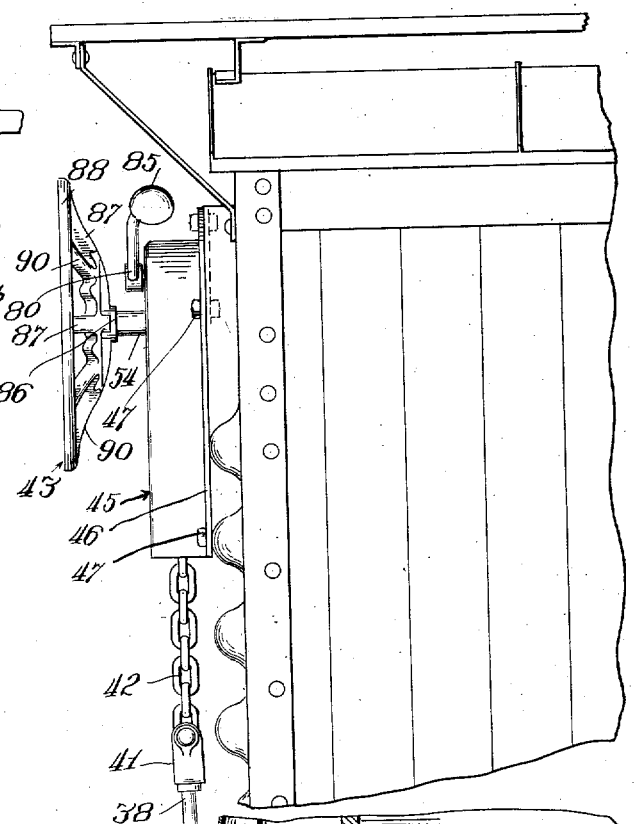
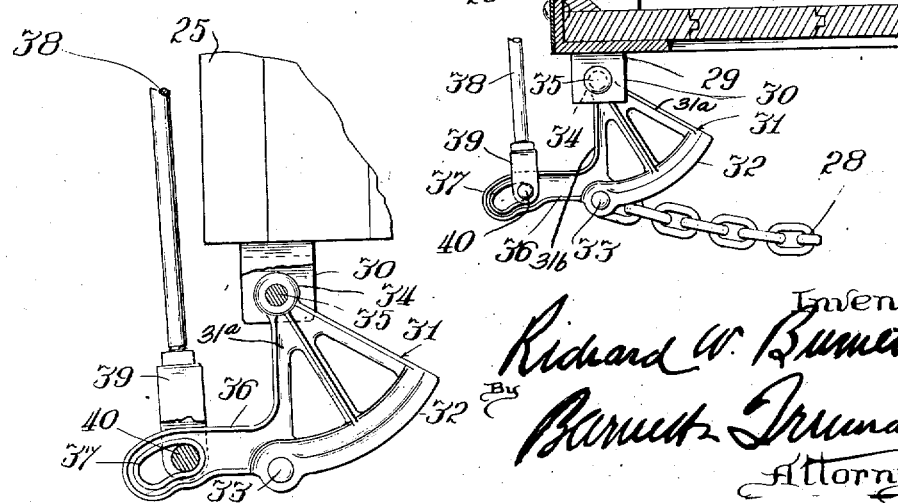

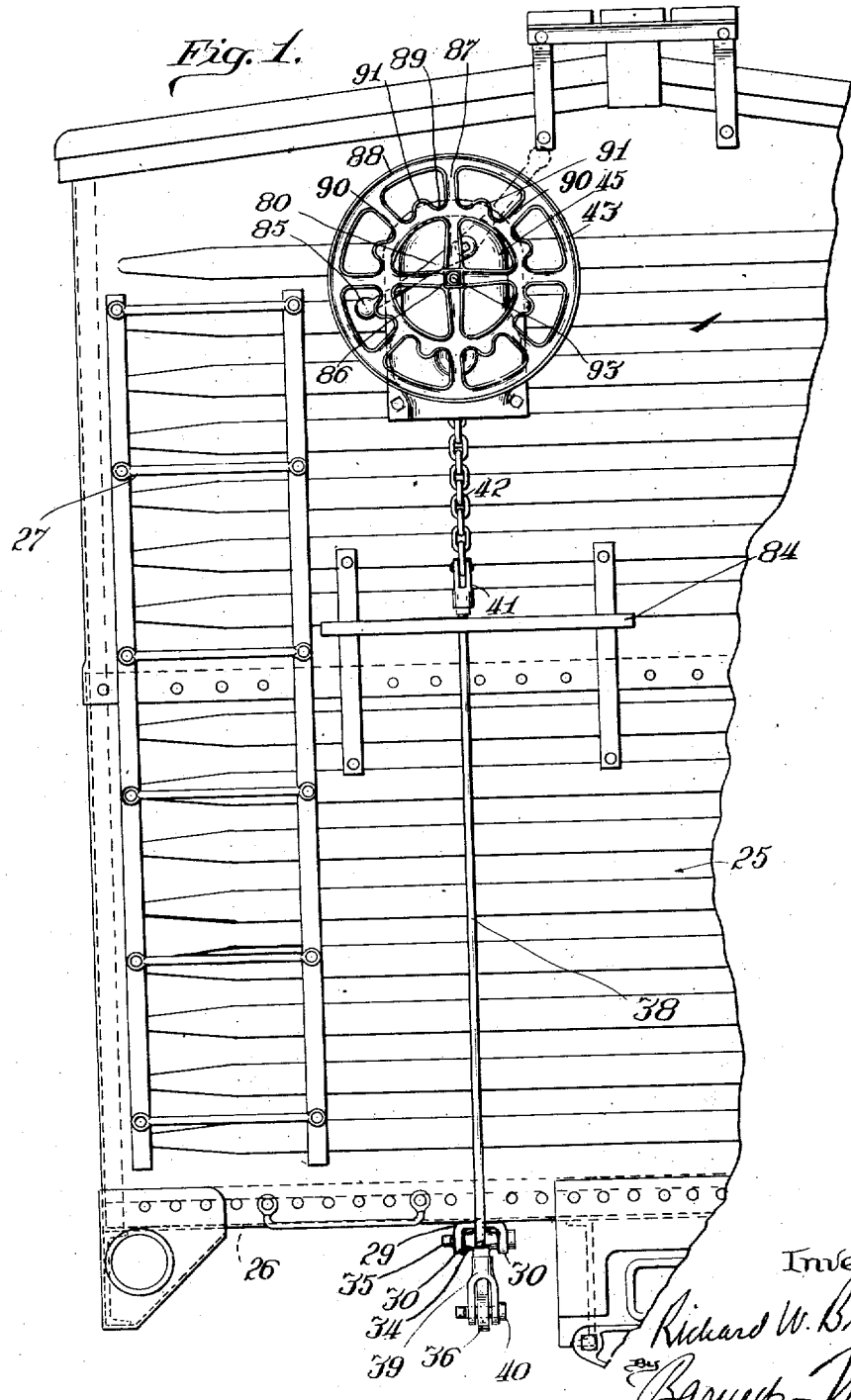

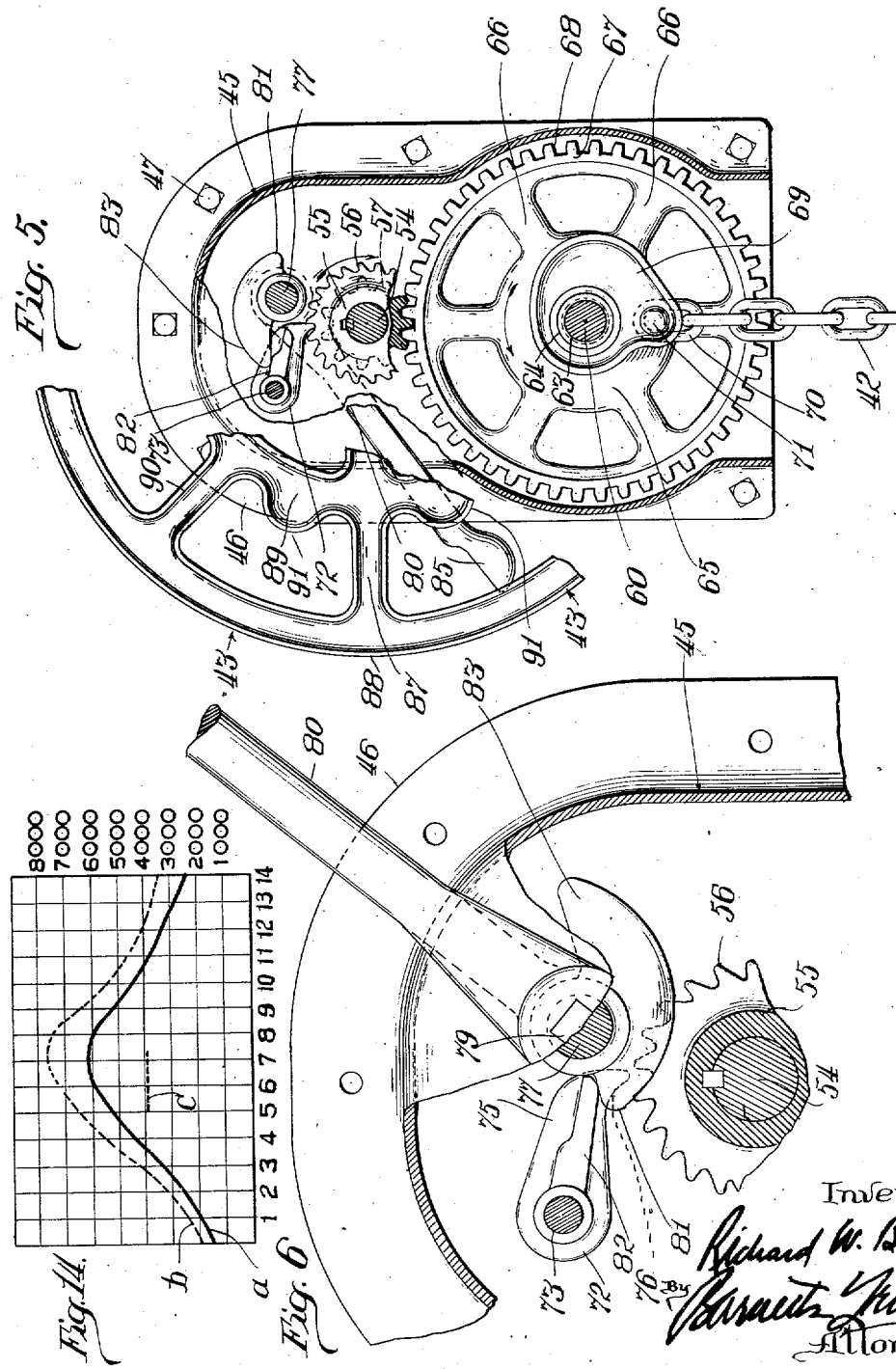

Sept. 15, 1936.  R. M. BURNETT  2,054,651
HAND BRAKE MECHANISM
Filed May 14, 1926  5 Sheets-Sheet 4
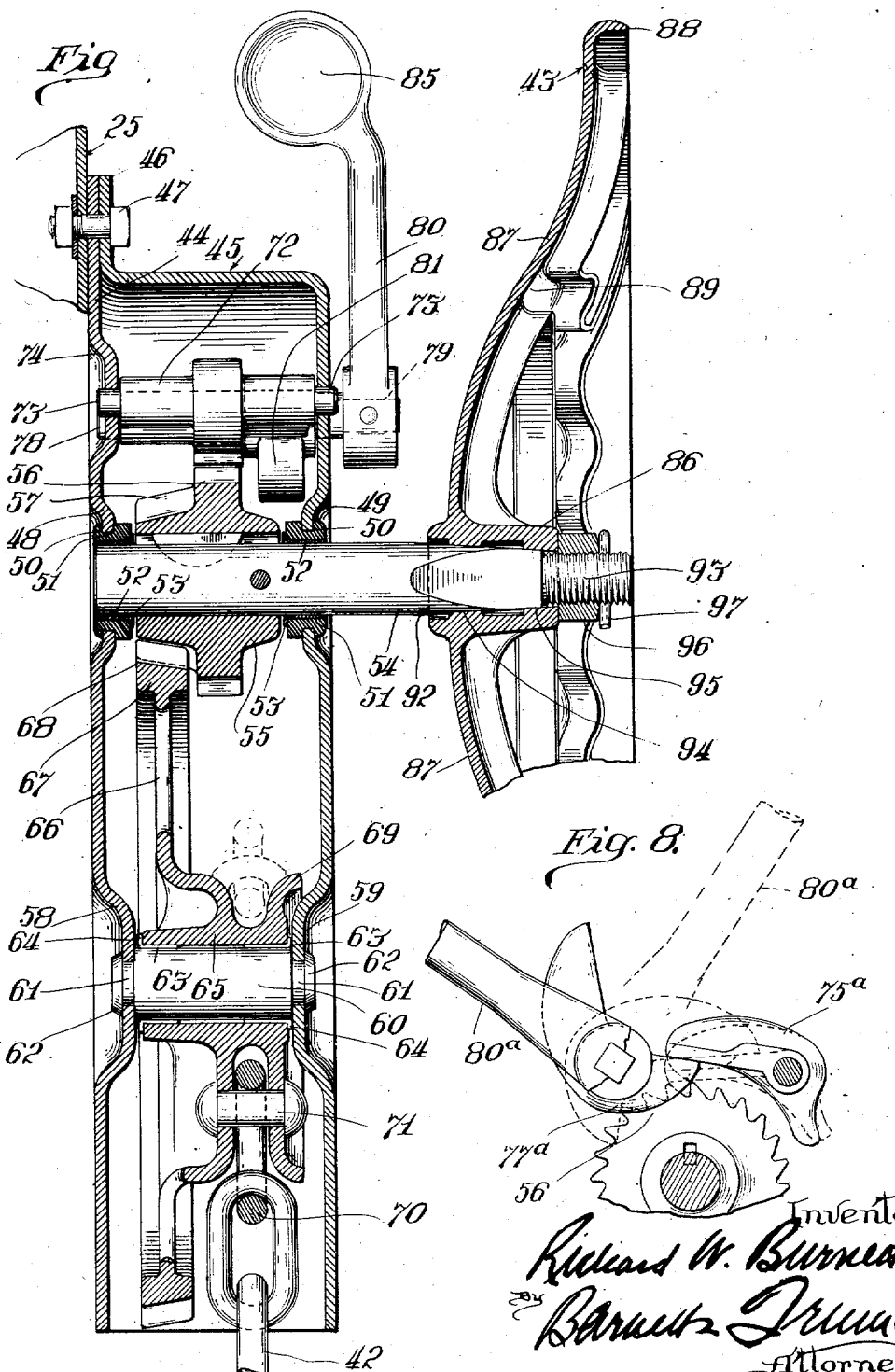

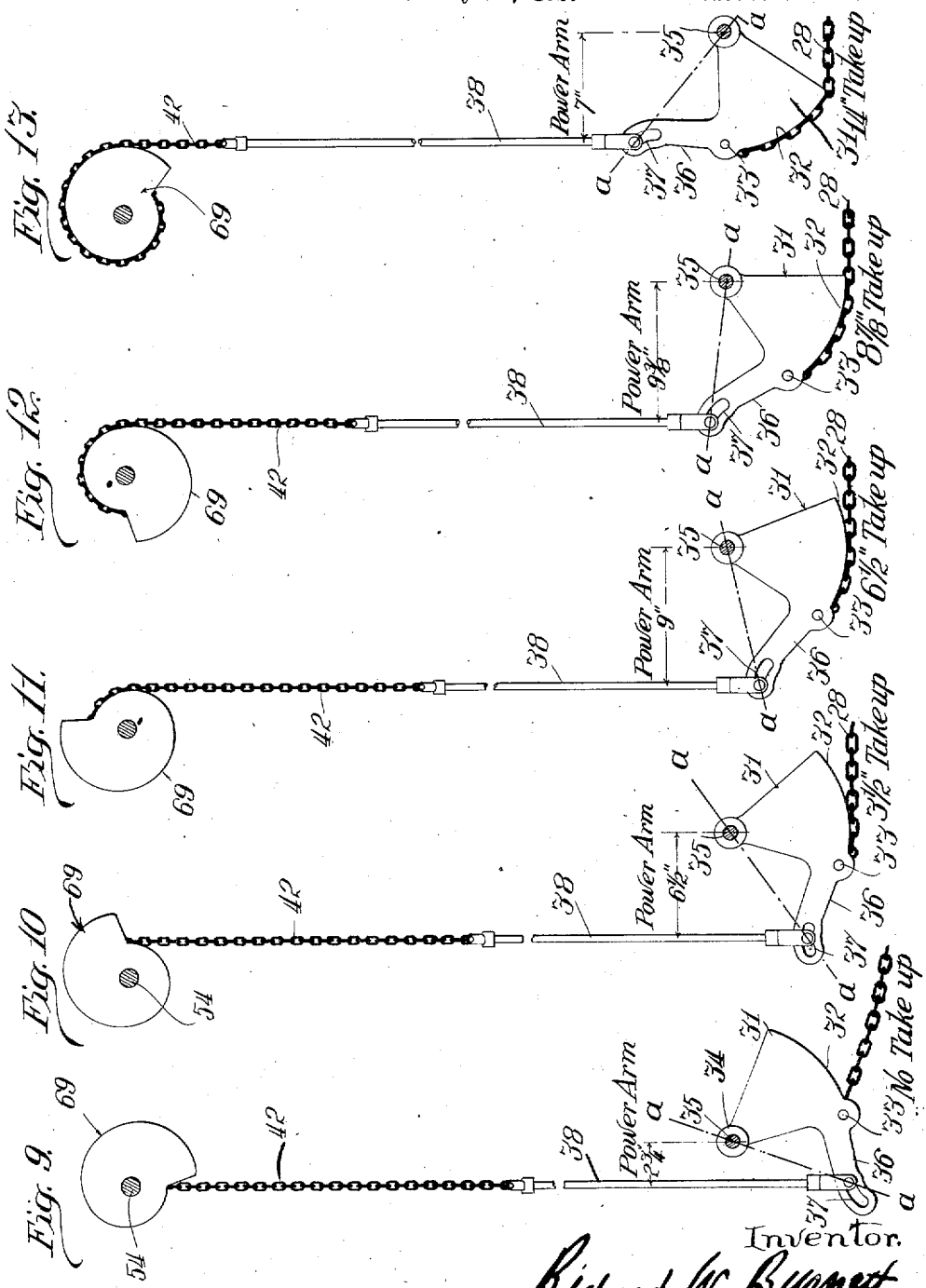

Patented Sept. 15, 1936

2,054,651

UNITED STATES PATENT OFFICE 2,054,651

HAND BRAKE MECHANISM

Richard W. Burnett, Chicago, Ill.

Application May 14, 1926, Serial No. 109,061

29 Claims. (Cl. 74—518)

My invention relates to hand brakes for railway cars, more particularly for cars of the freight car type, such as box cars, gondola cars, hopper bottom cars and the like, which are ordinarily provided, in addition to the air brakes, with hand operated brake mechanism for use particularly in switching or making up trains or for holding the car or train on a siding. In making up a train in a hump yard, for example, the hand brakes are used to slow up the car as it moves under its own momentum toward the train, and under these conditions in order that the life and limb of the brakeman may be safeguarded and injury to the car and its contents prevented by such control of the brakes as will obviate possible collision of the moving with the standing car, it is of the first importance that the brake mechanism be capable of very quick operation to take up slack in the brake connections and bring the brake shoes against the wheels of the car; that brake braking pressure be applicable to the car wheels with relatively small exertion on the part of the brakeman; that the braking pressure be capable of being relieved, either instantaneously or gradually, as circumstances require, and if instantaneously without reactive movement of the apparatus affecting the safety of the brakeman; that the apparatus be designed so that it will operate equally well on cars having brake riggings which require more or less movement to take up the slack, this depending upon wear on the brake shoes and other parts of the apparatus in respect to which there will be considerable variation in different cars or on the same car at different stages of wear; that the apparatus be constructed so that it will operate with maximum leverage over a wide range of positions of the apparatus corresponding to different amplitudes of movement required for bringing the shoes into contact with the car wheels whereby the apparatus will have the highest efficiency for all brake installations in fairly good condition and repair; and that finally the apparatus be arranged on the car so that it may be operated as conveniently and expeditiously as possible, and with the minimum of effort and of risk on the part of the operator. My invention has for its primary object to provide a hand brake which will meet these requirements and particularly to provide a brake apparatus which can be operated, both in setting and releasing, with one hand, so that the brakeman at all times may stand with both feet on the brake platform, for example, and maintain with his other hand a hold on a ladder rung or other such device; and the invention consists in a novel combination and arrangement of parts whereby the desired purpose is accomplished. While the features to be hereinafter described and claimed all contribute to the primary end in view, it is realized that some changes in the apparatus as shown and described, will be possible, if not necessarily desirable, wherefore it is my purpose to cover by patent, both broadly and narrowly, the apparatus as disclosed and all modifications of the same within the scope of the appended claims.

The invention contemplates operation of the brakes by means of a vertically arranged wheel of considerable diameter, in order to give proper leverage, and an incidental object of the invention is to construct the wheel so that the brakeman cannot, through carelessness, incur the risk of injury by putting his hand between the spokes of the wheel for the manipulation, for example, of the trip lever by which the brakes are released; and also to construct and arrange the wheel so as to comply with the requirements of the Interstate Commerce Commission, as to clearances.

A further object is to provide a releasable mechanism for holding the brake in set position, which can be operated, either by pushing down upon a trip lever, or pulling up on the trip lever, according to which alternative construction is adopted, and which shall consist of parts so constructed and related as to minimize vibration and chatter of the trip lever and associated parts, due to the movement of the ratchet under the dog, when the brakes are being set.

A further object is to provide a housing for the gearing and other parts of the brake mechanism, which will be strong, light, compact, simple and economical to manufacture, and will consist of stampings or pressed steel members that can be manufactured in large numbers, and also with accuracy, in respect particularly to the bearings for the gear shafts and trunnions and other rotating or oscillating parts, so that the manufacture and assembly of the parts of the mechanism can be accomplished quickly and cheaply.

Finally an important object of the invention is to provide a hand brake, which, besides having the advantages noted of quick take-up, of great braking power, of adaptation to different brake riggings in which the take-up varies and of ease and safety of operation, will be simple in its construction and consist of but few moving parts, so that the apparatus may be manufactured and installed at low cost and will withstand exposure to the weather as well as the abuse to which all railway freight car equipment is subject to a greater or less extent.

The invention is illustrated, in certain preferred embodiments in the accompanying drawings, wherein:

Fig. 1 is a fragmentary end elevation of a railway box car provided with the hand brake mechanism of my invention.

Fig. 2 is a fragmentary vertical sectional view of the car body showing the brake mechanism in side elevation.

Fig. 3 is a side elevation of the bellcrank to which the brake rigging on the under side of the car is attached.

Fig. 4 is a front elevation of the bellcrank.

Fig. 5 is a vertical sectional view of the manually operated mechanism for setting and releasing the brakes, the operating parts being shown in elevation, and the housing which encloses them, in section.

Fig. 6 is a similar sectional elevation, on a larger scale, illustrating particularly the releasable holding means.

Fig. 7 is a vertical sectional view of a plane extending longitudinally of the car, of the brake actuating mechanism.

Fig. 8 is a view similar to Fig. 6 but illustrating a modification.

Figs. 9 to 13 inclusive are diagrams to illustrate the relation between the leverages exerted on the brakes by the bellcrank, and the leverages, at corresponding positions of the apparatus exerted by the winding member which is operated by hand through the gearing shown in Figs. 5 and 7; and Fig. 14 is a graph to show the available power at different points in longitudinal travel of the brake rigging.

The mechanism is shown in the drawings as applied to a railway box car. It might, however, with suitable modifications within the skill of those versed in the art, be applied to other types of railway cars.

In the drawings, 25 designates the end wall of the box car and 26 the end sill of the car. The usual end ladder is indicated at 27 and 28 designates a chain attached to what is known as the hand brake rod (not shown) which is a part of the brake rigging on the under side of the car, this rigging including the usual brake shoes, brake beams, equalizing bars and air cylinders for setting the brakes. The term "brake rigging" is used hereinafter in the specification and claims in this sense.

Secured to the under side of the end sill 26 of the car is a bracket 29 having depending ears 30 which are spaced quite widely apart, as shown in Fig. 4. 31 is a bellcrank or rocking member preferably formed with a winding surface 32 for the chain 28 which is attached to the brake rigging, this chain being fastened to the bellcrank 31 by a pivot stud 33. The bellcrank is formed with a widely extended hub portion 34 which is pivoted to bracket 29 between the ears 30 by means of a pivot pin 35. The bellcrank is also formed with a forwardly projecting arm 36 which arm (by which is intended such part of the bellcrank or rocking device, whatever form said device may take, which projects outwardly for engagement by the connection to the winding mechanism) is preferably formed at its outer end with a slot 37 having a downward curve, the body portion 31a of the bellcrank, which is preferably segmental in form, is provided with a reinforcing web 31b which widens out toward the hub.

The bellcrank is rocked so as to take up the slack in the brake rigging and set the brake shoes against the wheels of the car by means of a rod 38 terminating in a fork 39 attached to the bellcrank by means of a pivot pin 40 which extends through the slot 37 in the arm 36 of the bellcrank. The rod 38 is attached by a clevis member 41 to a chain 42, and, to set the brakes, this chain is wound on a winding member, rotated by means of a hand wheel 43 arranged on the end wall of the car, with the interposition of certain gearing for the purpose of multiplying the power applicable to the winding member by the hand wheel.

The gearing referred to, together with the mechanism for holding the brakes in the set position and for releasing them, is contained in a housing composed preferably of two sheet steel pressed housing members, a back member 44 and a front member 45, the latter dished and formed with a flange 46 by which it is attached to the back member and car wall 25 by means of bolts 47 or other fastening devices. The back and front members of the housing are formed, preferably, with oppositely disposed bosses 48, 49, apertured at 50 for the bronze bearings 51 which may be cast on the housing members. The bearings 51 are preferably provided with permanently lubricated bushings 52 having end thrust flanges 53, and turning in the bearings thus bushed is the operating shaft 54 of the brake apparatus. On the outer end of the shaft 54 is fixed the hand wheel 43, above referred to, and keyed to the shaft within the housing is a gear and ratchet wheel consisting of a hub portion 55 provided with ratchet teeth 56 and gear teeth 57.

The housing members 44, 45, are formed, below the bosses 48, 49, with another pair of interiorly projecting bosses 58, 59 and between these last named bosses is arranged an arbor or fixed shaft 60 having studs 61 of reduced diameter which are riveted over on the outer sides of the housing members as indicated at 62. A unitary winding member and gear is revolubly mounted on the arbor 60, permanently lubricated bushings 63 with end thrust flanges 64 being interposed between the arbor and the winding and gear member. The latter consists of a hub portion 65 provided at one end with a gear wheel comprising spokes 66, a rim 67, and gear teeth 68, the teeth adapted to mesh with the gear teeth 57 on the gear and ratchet member 55. Hub 65 is formed at its other end with a channeled winding member 69, the channel of which is formed so as to be fitted by the links of chain 42, the upper link 70 of which is attached to the winding member by means of the rivet 71. The winding surface of winding member 69 is eccentric with reference to the axis of rotation of the winding member and its gear, the eccentricity being designed with reference to the leverages of the bellcrank 31 at different angular positions of the bellcrank, as will be hereinafter described.

To cooperate with ratchet 56 on the small gear 55, this gear being of considerably smaller diameter than the gears 67, 68, is a pivoted pawl or dog comprising a hub 72 having gudgeons 73 extending through perforations in the front and back members of the housing, (the back member being formed with an inturned boss 74 at the place pierced for the gudgeon) and a nose portion 75 having a tooth 76 to engage with the ratchet teeth 56. A rock shaft 77 is journaled in the housing walls near the toothed end of dog 75, the rock shaft having gudgeons 78, 79 extending through the back and front plate of the housing. A tripping lever 80 is fixed to the gudgeon 79, that is to the outer end of the rock shaft. On the rock shaft, within the housing, is a tripping and holding member 79ª formed with a lug 81 adapted to engage with one end of a lateral web 82, formed on the dog 75. The member 79ª is also provided with a lug 83 adapted to engage with the upper surface of the web 82 of the dog 75 at a point close to the pivot point of the dog. The purpose of this latter arrangement is to prevent the rock shaft 77 and its lever 80 from vibrating, or at least to minimize such vibration, when the ratchet member 55 is rotated in setting the brake, the tooth 76 of the pawl in such case riding over the teeth 56 of the ratchet. With lug 83 bearing against the pawl close to the pivot point of the pawl, the vibratory movements imparted to the holding and tripping device are short movements. By arranging the lug 81 so as to engage with the end of the pawl which carries the tooth 76 great force can be exerted against the pawl for disengaging it from the ratchet, and this may be necessary for instantaneous release of the brakes particularly when the brake shoes are close set against the wheels. The lever 80 of the holding and tripping member is of considerable length, in order to afford adequate leverage for disengaging the pawl from the ratchet and in order to properly and securely hold the dog in engagement with the ratchet, despite the disadvantage, in this respect, of having the bearing point of the holding device close to the pivotal center of the dog.

With the parts of the holding and tripping mechanism arranged as shown in Figs. 1, 2, 5, and 7, the lever 80 of the trip will extend downwardly and to the left (relative to the position of the brakeman standing on the braking platform 84—Fig. 1), when the trip device is in the holding position. When the lever is turned to the tripping position, (full lines Fig. 6, dotted lines Fig. 1), the hand grip 85 of the lever will extend above the rim of operating wheel 43, and to the right of the center of the wheel, so that the brakes may be released either by the brakeman pressing the lever down with his hand, assuming that he is standing on platform 84, or by the foot of the brakeman if he is on the roof of the car. In Fig. 8, I have shown a modified arrangement which involves a reversal of the positions of the hand lever on the tripping device. The dog 75ª is arranged on the right-hand side of this apparatus and the tripping member 77ª on the left-hand side. The tripping lever 80ª is shown in full lines in its tripping position, and in dotted lines in its holding position. When the lever is turned to the tripping position, it can be reached very conveniently by one standing on the end ladder 27 (Fig. 1), and pulled down to release the brakes. A further downward movement of the lever will bring the tail end of dog 75ª against the ratchet wheel 56 so that the release of the brake mechanism may be retarded by a pressing down on the lever.

The hand wheel 43 is constructed with several objects in view: To have a large diameter so that its leverage will be great, and this is possible when the wheel is arranged vertically on the end of the car; to prevent the brakeman from carelessly putting his hand between the spokes of the wheel in order to manipulate the trip lever 80 to provide for a wide bearing of the wheel hub on the operating shaft necessary for a permanently rigid connection; and to bring the attachment of the wheel to the operating shaft within the plane of the rim, and the plane of the rim far enough out from the tripping lever 85 as to comply with Interstate Commerce Commission requirements as to clearances. According to these requirements, the operating member, that is, the rim of the brake wheel when the wheel is arranged to oscillate in a vertical plane, must be at least four inches from any projecting part on the car, that is, in this case at least, four inches in front of the trip lever; and there must be no part projecting from the end wall of the car outwardly of the plane four inches from the pulling face of the car coupler knuckle when the coupler is against the striking casting of the car. To conform to these requirements, the wheel 43 consists of a hub 86, outwardly curved spokes 87 and a rim 88, the wheel having a dish shape, so to speak, and the webs forming the rim and spokes being preferably channeled, so as to give strength and at the same time lightness, and to provide convenient hand grips. The brakeman in setting the brakes may grasp either the rim of the wheel or the spokes. In order to prevent the brakeman from putting his hand through the spokes of the wheel, the wheel is formed with a circular web 89, preferably channel shaped in cross section, intermediate the hub 86 and rim 88, and additional hand grip spokes 90 connect the annular web 89 with the rim 88. Furthermore, the web 89 is preferably provided with projections 91 extending into the spaces between the spokes 87, 90.

The outer end of the operating shaft 54 is tapered and square in cross section, as indicated at 92, the shaft terminating in a threaded stud 93. The hub 86 of wheel 43 is formed with surfaces 94, 95, rectangular in cross section and tapered, which engage the surfaces 92 on the shaft 54 with a drive fit. The wheel is held on the shaft by a nut 96 and cotter pin 97. It will be observed that the attachments of the wheel are all within the plane bounding the outer edges of the rim 88 of the wheel.

The winding member 69 has a winding surface consisting of a single circumference in distinction to the spiral winding surfaces which have been used or proposed for use in hand braking mechanism. The winding member should be designed so that even under extreme conditions, the chain 42 should not have to wind around the winding member more than once. That is, there should be no overlapping, which is what gives insecurity to the common hand brakes involving winding a chain in a plurality of turns on the end of a brake mast. Whenever the brake shoes come into contact with the wheels of the car, it should be possible to apply to the wheels the maximum braking power of which the apparatus is capable, and this regardless of whether the amount of travel of the hand brake rod (by which the take-up movement of the brake rigging may be measured) is short or long. Railway brakes are ordinarily considered serviceable from the point of view of the air brake system where the travel of the air cylinder piston is eight inches or less, the brakes being considered unserviceable, and the use of the car forbidden in case of a piston travel of ten inches. Due to additional slack that there may be in the hand brake connections, it is desirable that a hand braking apparatus be capable of taking up fourteen inches of slack for extreme cases of wear or maladjustment. For the great majority of cars in service the shoes will come into contact with the car wheels at from five to eight inches of travel of the so-called "hand brake rod". The expression "normal travel" as used herein signifies the distance the brake rod moves in the application of the brakes from its release position to its brake setting position, usually a distance somewhere between five and nine inches. Hence the apparatus should be capable of exerting maximum braking capacity at any point within this range. Until this range is reached the take-up should be as rapid as possible. After this range has been passed the brakes should be capable of operating up to a travel of fourteen inches, but since only a few cars will have brakes requiring more than eight inches take-up and proportionately fewer take-ups approaching fourteen inches, if any sacrifice has to be made in power it should be at the higher brake rod travel ranges.

An apparatus meeting these requirements is provided by employing, as herein shown, a bellcrank, (and by bellcrank I intend any rocking member with lever action varying with the angular position of such member), which bellcrank is arranged so that its effective power arm is short, for the released position of the brakes, but increases as the take-up proceeds, and by applying power to the bellcrank by means of a chain or cable and a drum, a winding member having an eccentric winding surface of small radius at the place where the chain first winds upon it, that is through the take-up and normal setting ranges of brake rod travel, and of increasing radius after these ranges have been passed. The preferred relationship of the parts is shown in Figs. 9 to 13 of the drawings, in which, for the sake of illustration, the winding member is drawn as though rotating in the same plane as the bellcrank instead of at right angles to the bellcrank as is the case in actual practice. By referring to these figures it will be seen that as the bellcrank approaches a horizontal position, with a brake setting movement of the apparatus, that is, as line a—a approaches the horizontal, the effective power arm of the bellcrank lengthens, and with it the leverage which the bellcrank exerts on the brakes, chain 28 winding on surface 32 which is concentric with the pivotal axis of the bellcrank, so that this factor is relatively constant. As the bellcrank rocks upwardly away from horizontal position, the leverage on the brakes decreases. As the arm 36 of the bellcrank rises, the rod 38 slips outwardly in the slot 37 and this also increases the leverage of the bellcrank as it moves from the initial to the brake setting position. Fig. 9 shows the parts of the apparatus in their initial position; Fig. 10 shows the parts at a three and one-half inch take-up, or brake rod travel, Fig. 11 with the parts at a six and a half inch take-up, Fig. 12 with the parts at a fourteen inch take-up. The leverage of the bellcrank, as will be seen by the figures indicating the effective power arm length at different angular positions of the bellcrank, increases and then begins to decrease. The bellcrank is exerting its maximum power, or very nearly so, with the parts in the position shown in Figs. 11 and 12, and this is where the brake shoes for average installation or in serviceable condition are likely to come into contact with the wheels of the car. The winding member 69 is formed so that as chain 42 begins to be taken up, it winds first on a surface of minimum radius measured from the center of rotation of the winding member. Preferably this surface of minimum radius is continued for approximately 180° of the winding member, so that up to almost nine inches of hand brake rod travel, the winding member operates at maximum leverage. As the limit of hand brake rod travel is approached, the radius of the winding surface increases with consequent diminution of power, which is further diminished by the angular position of the bellcrank. However, cases of such long distance travel as is indicated in Fig. 13, for example, are rare, and even in such cases, the hand brake can be operated and will exert a very considerable braking pressure, although not the maximum braking pressure. Fig. 14 indicates graphically the power in pounds applicable to the brakes at different points of the hand brake rod travel. The curve also shows the rapidity of take-up during the first part of the operative movement of the parts of the apparatus.

The lower curve a represents the power developed with a hand wheel of seventeen and one-half (17½) inches diameter; the upper curve b with a twenty-two inch wheel. The ordinates represent inches of hand brake rod travel; the abscissas, power developed in pounds, theoretically, not counting friction. The straight broken line c represents air brake requirements in pounds according to American Railway Association standards. The winding member, it will be understood, is made eccentric merely in order to get sufficient surface to take up the slack in the brake connections for an extreme hand brake rod travel say up to fourteen inches, since the hand brake even in these extreme and rare cases should be operable. While the small radius of the concentric portion of the winding surface militates against quick take-up, this is offset during the taking up of the slack by the movement of its short bellcrank which, as a consequence of its short power arm has a relatively rapid peripheral velocity during its initial rotary movement. Moreover, by providing the gears with lubricated bearings, by using a hand wheel of large diameter and because the friction of the bellcrank bearing is small, the brake apparatus of my invention will give a quick take-up even though it is necessary to give the wheel several revolutions. For example, the wheel can be whirled with one hand for about two turns and a half to give a take-up equivalent to seven inches of hand brake rod travel, and this whirling movement will, before it stops, set the brakes (in equipment in average condition) with a pressure of approximately 1400 pounds, which is about as much as is obtainable with the ordinary brake mast and wheel type of brake apparatus with the use of a club in the wheel. With a brake mechanism capable of taking up the slack by a very quick whirling movement of the hand wheel, a take-up by an arrangement of changing leverages is a matter of no practical importance; and the brake apparatus of this invention differs radically from the proposed brake mechanisms with so-called quick take-up devices, in that it makes such devices, which are uncertain in their action for the reasons stated, quite superfluous. With further turn of the wheel after the slack has been taken up and the brakes set to the pressure indicated, it is quite possible for a single man to set the brakes with a pressure of 5,000 pounds, which is greatly in excess of the normal air brake pressure. For purely constructional reasons it may be desirable to attach the chain 42 to the winding member 69 at a distance from the turning center of the winding member a trifle greater than the minimum radius of the winding member, and this arrangement is shown in Fig. 5 of the drawings;

but this does not affect the principle of operation as illustrated in the diagrams of Figs. 9 to 13 as there will be a certain amount of looseness and slack in the connections of the parts of the apparatus which will be taken up at once and without the exertion of much force so that in effect the winding of the chain during the operation of bringing the shoes against the car wheels will take place on the part of the winding member of minimum radius.

*Summary of operation.*—Referring to Fig. 1 the brakeman may stand on the platform 84 and maintain his position thereon, against any shock which the car may receive, by holding on with his left hand to one of the rungs of the end ladder 27, or to some other suitably provided hand hold. The brake mechanism may be operated both to set and release the brakes by one hand, that is by the right hand while the brakeman's safe position on the platform is maintained with the left hand. To set the brakes the brakeman grasping the hand wheel 88 by the rim or by one of its spokes gives the wheel a whirling or spinning movement which takes up the slack in the brake rigging and brake setting mechanism and sets the brake shoes against the wheels with considerable pressure. The extent of the spin depends upon the amount of slack in the brake rigging, which may vary considerably in different cars, but the operation in any case is accomplished by one movement and almost instantaneously. If further pressure of the brake shoes on the wheels is required the brakeman grasps the under portion of the wheel and gives the wheel an upward turn. This movement is necessarily short since the shoes are already against the wheels. Hence the brakes may be set to their maximum pressure by two movements, each of which requires but a very short time and which can be executed very quickly one after the other by the use of the hand only.

To obtain a forced instantaneous release of the brakes the brakeman still holding with his left hand to the ladder rung, lays hold with his right hand on the tripping lever 80 and movies it (having reference to the form of the invention shown in Figs. 1 and 6) from the position shown in full lines in Fig. 1 to the dotted line position Fig. 1 and full line position Fig. 6. The lug 81 on the trip lever bearing against the under side of the outer end of the web 82 on pawl 72 forces the pawl out of its engagement with ratchet 56 and the brakes are released, the hand wheel spinning in a counterclockwise direction. This reaction of the brake mechanism on release does not in any way endanger the brakeman who has hold of the ladder rung with one hand and of the release or tripping lever with the other hand. With the tripping mechanism disclosed no difficulty is experienced in effecting an instantaneous release of the brakes even when the shoes are set to maximum pressure. The tripping lever and dog are on axes spaced apart. The operating arm of the lever is very long in comparison to the lug in contact with the dog and the bearing of this lug is at the outer end of the pawl.

Although the apparatus is capable of a forced, instantaneous and complete release of the brakes, it is also possible to manipulate the mechanism or to obtain a graduated or controlled release which is automatic in the sense that with the trip lever properly set for this operation the release takes place when the brakeman turns the operating wheel in the brake-setting direction, and while the wheel is in the control of the brakeman; and this may be very desirable in making up trains, for example, in a hump yard. To bring about this automatic and graduated release the brakeman, still holding onto the end ladder rung or other hand hold with his left hand, moves the trip lever 80 from left to right, using his right hand, until the lug 81 is brought to bear against the under side of web 82. The lever, however, is not pressed down to disengage the dog. The braking pressure as between ratchet and dog will be sufficient to maintain the engagement of dog and ratchet as against the weight of the operating arm of the lever. The brakeman then grasping the hand wheel with his right hand gives it a slight movement clockwise, that is in the brake setting direction, whereupon, the pressure being relieved between the ratchet and dog, the dog is thrown out of engagement with the ratchet by the weight of the trip lever. The release is therefore in a sense automatic. The brakeman, however, can hold the brake pressure between the brake shoes and the wheels by maintaining his hold on the hand wheel, or he may release it to any extent desired by allowing the hand wheel to turn to a greater or less extent in the counterclockwise direction. His right hand being on the wheel, the brakeman can immediately increase the braking pressure by pulling up on the wheel, so that the car in moving toward the stationary car to which it is to be coupled, can be accurately controlled to increase or slow down its movement, thereby avoiding the shocks and impacts which have been so disastrous to the life and limb of the brakemen and so destructive to rolling stock and lading when in switching operations of this sort the brakes have been under control of the brake mast and horizontal hand wheel type of brake setting apparatus in general use for many years on railway freight cars.

The brakeman can also effect a step by step release by giving the tripping lever a disengaging movement followed by a quick movement in the other direction so that the dog disengaged from one notch of the ratchet will immediately engage the succeeding notch. This "notching off" method can be used, for example, to relieve some of the pressure in case the brakeman wishes to effect a controlled release but the brakes are set so tightly that he is not strong enough to turn the wheel any further in the brake setting direction.

In all of these operations of setting and releasing the brakes, the brakeman uses only one hand, his right hand, the other hand being used to maintain his position of safety on the brake platform. Both feet remain on the brake platform or in some cases the brakeman keeps one foot on a ladder rung.

The quick take-up by spinning the wheel is accomplished in a very much shorter time than the corresponding operations which it has been proposed to accomplish by the so-called quick take-up mechanisms operating on the principle of change of leverages. The spinning movement can be accomplished almost instantaneously. This is due to the elimination of friction, and in this regard the employment of a bellcrank turning on a fixed axis for increasing leverages and transmitting the vertical pull brought about by the winding mechanism to a horizontal pull on the brake rigging is a feature of importance in combination with the simple type of winding mechanism employed. The vertical arrangement of the wheel permits the use of a large operating wheel which in turn makes possible a very simple winding mechanism which, because of its small compass, can be arranged on the end of the car without violating Interstate Commerce Commission requirements as to end clearances. The direct connection between the small gear of the winding mechanism with the hand wheel makes possible the graduated release; and there is no objection to having the operating wheel spin, reversely, when the brakes are instantaneously released, since the position of the operating wheel on the car is such that the brakeman can always have a hand hold on the car with his left hand and the operating member being a wheel it is not possible for it to injure the brakeman even if he should be near enough to be in contact with it when this reverse movement takes place.

The forced instantaneous release, complete or partial, and the automatic graduated release are both accomplished by manipulation of a single lever so that the possibility of confusion in case of emergency for part of the brakeman in case of emergency for example, is reduced to a minimum. This single releasing mechanism, useable for a double purpose, is extremely simple and consists of a very few strong parts. Simplicity of construction in a brake apparatus intended to be arranged upon the end wall of the car or in other exposed positions on the car structure is important both because of the necessity of compactness required by end clearance regulations and also so that the parts may be large and strong enough to withstand the braking pressures developed and the rough usage to which any apparatus on a freight car is likely to be subjected.

The step by step release, in the apparatus as shown, can be effected because the dog is balanced as to weight, so that its forward end will immediately drop back on the ratchet as soon as released by the tripping lever. The holding and releasing mechanism must be made quite strong, in order to withstand the shocks which result from this method of release; and to avoid the possibility of the breakage of the parts by preventing the possibility of this mode of operation the tail end of the pawl may be weighted so that when the forward end is disengaged from the ratchet it will swing clear of the ratchet and can only be engaged therewith by a complete reversal of the position of the tripping lever, as shown for example in my copending application, Serial No. 229,967.

By the word "chain" as used in the specification and claims, I intend any suitable flexible connecting member which will wind over the winding surface of element 69. By "bellcrank" I intend any rocking or oscillating member to which the chain 28 of the brake rigging may be attached, or with which it may be otherwise suitably engaged. By the term "brake rigging" I intend the apparatus under the car body including the brake shoes and the means for applying the brake shoes to the wheels of the car. The bell crank in the preferred embodiment of my invention shown and described has two functions: it translates the vertical pull on the chain 42 and rod 41 into a horizontal pull on the brake rigging and it effects a quick take-up of slack in the brake rigging and brings about an increase of the power applicable to the brake rigging by means of the hand wheel, as the hand wheel is rotated in the brake setting direction. This last named function of the bell crank makes possible a short gear train, so to speak, consisting preferably of two gears only, that is a means for multiplying power at constant ratio in which friction is reduced to a minimum; and the combination of such power multiplying means with the quick take-up and power increasing means provided by the bell crank results in a transmitting mechanism between the hand wheel and brake rigging in which the slack of the brake rigging may be taken up practically instantaneously by a whirling movement of the wheel, particularly where the transmission chain winds upon a drum of the disc type the circumference of which is at least as great as the maximum possible take-up of the chain so that the winding surface center line is in a plane and there is no overlapping of the chain with consequent reduction of friction to the minimum.

This application is a continuation in part of my co-pending applications, Serial No. 10,248, filed February 19, 1925, and Serial No. 17,239 filed March 21, 1925.

I claim:

1. In combination with the brake rigging of a railway car, a manually operated mechanism for setting the brakes, comprising a bellcrank to which said brake rigging is attached, an operating rod attached to the bellcrank, a large gear provided with a winding member having a winding surface, a part of which is of substantially uniform radius, measured from the center of rotation of the winding member, and a part of gradually increasing radius, a chain connected to the rod and to said winding member at a point to be first wound on the part of the winding surface of uniform radius when the brakes are being set, so as to be wound thereon, a small gear meshing with the large gear, and a hand wheel rigidly connected with the small gear.

2. In combination with the brake rigging of a railway car, a manually operated mechanism for setting the brakes, comprising a bellcrank to which said brake rigging is attached, an operating rod having a pivotal and sliding connection with the bellcrank, a large gear provided with a winding member eccentric with reference to the axis of said gear, a chain connected to the rod and to said winding member at a point to be wound first over the part of the winding member of smaller radius, a small gear meshing with the large gear, and a hand wheel rigidly connected with the small gear.

3. In combination with a railway car and its brake rigging, manually operable mechanism for setting the brakes comprising a bellcrank to which the brake rigging is attached, a housing on the car wall, an eccentric vertically disposed winding member in said housing, gearing for rotating said winding member, a horizontal shaft for operating the gearing which extends out of the housing, a hand wheel on said shaft and connecting means between the bellcrank and the winding member comprising a chain attached to the winding member at such a point thereon that in setting the brakes the chain winds first on the portion of the winding member of smaller radius.

4. In combination with the brake rigging of a railway car, mechanism for operating the same comprising a bellcrank to which the brake rigging is attached, a winding member having an eccentric winding surface and connecting means between the bellcrank and winding member comprising a chain attached to the winding member so as to first wind on the part of the winding surface of smaller radius when the apparatus is operated to set the brakes.

5. In combination with the brake rigging of a railway car, mechanism for operating the same comprising a bellcrank to which the brake rigging is attached, a winding member having a winding surface, a portion of which is concentric with the axis of rotation of said member and a portion of which is of gradually increasing radius, and connecting means between the bellcrank and winding member so as to first wind on the part of the winding surface of the concentric portion of the winding surface when the apparatus is operated to set the brakes.

6. In combination with the brake rigging of a railway car, mechanism for operating the same comprising a bellcrank to which the brake rigging is attached, a winding member having an eccentric winding surface and connecting means between the bellcrank and winding member having a sliding engagement with the bellcrank and comprising a chain attached to the winding member so as to first wind on the part of the winding surface of smaller radius when the apparatus is operated to set the brakes.

7. In combination with the brake rigging of a railway car, mechanism for operating the same comprising an oscillating member to which the brake rigging is attached, the leverage of which is first increased and then decreased when moved in the brake setting direction and means for giving angular movement to said oscillating member comprising a revoluble member, the leverage of which is at the maximum during the first part of the movement of said oscillating member.

8. In combination with the brake rigging of a railway car, mechanism for operating the same comprising an oscillating member to which the brake rigging is attached, the leverage of which is first increased and then decreased when moved in the brake setting direction, and a winding member having an eccentric winding surface, a connecting means between the oscillating member and winding member comprising a chain attached to the winding member so as to wind thereon, from the point of minimum radius towards that of maximum radius of the winding member.

9. In combination with the brake rigging of a railway car, mechanism for operating the same comprising a bellcrank to which the brake rigging is attached, arranged so that the bellcrank has an effectively short power arm in the initial position of the apparatus which increases with the angular movement of the bellcrank, a winding member having an eccentric winding surface and connecting means between the bellcrank and winding member comprising a chain attached to the winding member so as to first wind on the part of the winding surface of smaller radius when the apparatus is operated to set the brakes.

10. In combination with the brake rigging of a railway car, mechanism for operating the same comprising a bellcrank to which the brake rigging is attached, arranged so that the bellcrank has an effectively short power arm in the initial position of the apparatus which increases with the angular movement of the bellcrank, a winding member having a winding surface, a portion of which is concentric with the axis of rotation of said member and a portion of which is of gradually increasing radius, and connecting means between the bellcrank and winding member comprising a chain attached to the winding member so as to first wind on the part of the winding surface of the concentric portion of the winding surface when the apparatus is operated to set the brakes.

11. In combination with the brake rigging of a railway car, mechanism for operating the same comprising a bellcrank to which the brake rigging is attached, arranged so as to have an effectively short power arm when in its initial position, which power arm increases with the angular movement of the bellcrank, a rod attached to the bellcrank, a chain attached to the rod, and a winding member having an eccentric winding surface, centered in a single plane, the length of which surface is sufficient to take up all of the slack in the brake connection, to which the chain is attached at a point of substantially minimum radius of the winding member.

12. In combination with the brake rigging of a railway car, mechanism for operating the same, comprising a winding member, means for connecting the brake rigging with the winding member comprising a chain attached to the winding member, gearing to revolve the winding member provided with a ratchet wheel, a hand wheel to operate the gearing, and holding and friction retarding mechanism comprising a pivoted dog having a tooth at one end to engage the ratchet wheel teeth, the other end of which dog is adapted, when the dog is rocked on its pivot to disengage its tooth from the ratchet wheel teeth, to be brought to bear upon said ratchet wheel with retarding pressure and a lever to operate said dog.

13. In combination with the brake rigging of a railway car, mechanism for operating the same comprising a winding member, means for connecting the brake rigging with the winding member comprising a chain attached to the winding member, means for revolving the winding member and releasable means for holding the winding member in its brake setting position comprising a hand operated element for retarding the reverse movement of the winding member when released.

14. In combination with a railway car and its brake rigging, mechanism for manually operating said brake rigging comprising a bellcrank oscillating in vertical plane on a fixed axis to which the brake rigging is attached and formed with an arm outwardly projecting from the car, a winding member above said bellcrank, connecting means between said bellcrank arm and the winding member comprising a chain attached to the winding member, said member being formed with a winding surface for the chain, eccentric with respect to the axis of said member, the center line of which is in a single vertical plane and which is of such length that the brake rigging may be given substantially its maximum travel in less than one revolution of said member, gearing for revolving said winding member and a hand wheel for operating said gearing by a continuous movement.

15. In combination with a railway car and its brake rigging, mechanism for manually operating said brake rigging comprising a bellcrank oscillating in vertical plane on a fixed axis to which the brake rigging is attached and formed with an arm outwardly projecting from the car, a winding member above said bellcrank, connecting means between said bellcrank arm and the winding member comprising a chain attached to the winding member, said member being formed with a winding surface for the chain, the center line of which is in a single vertical plane, the portion of which first engaged by the chain, when said member is rotated in the brake setting direction, being closer to the axis of said member than the remaining portion and which surface is of such a length that the brake rigging may be given substantially its maximum travel in less than one revolution of said member, gearing for revolving said winding member and a hand wheel for operating said gearing by a continuous movement.

16. In combination with a railway car and its brake rigging, mechanism for manually operating said brake rigging comprising a winding member, connecting means between said brake rigging and the winding member comprising a chain attached to the winding member, said member being formed with a winding surface for the chain, the center line of which is in a single vertical plane and which is of such length that the brake rigging may be given substantially its maximum travel in less than one revolution of said member, gearing for revolving said winding member, a hand wheel for operating said gearing by a continuous movement, and means for releasably holding said winding member in the brake setting position comprising a hand operated member for retarding the reverse movement of the winding member when released.

17. In combination with a railway car and its brake rigging, mechanism for manually operating said brake rigging comprising a winding member, connecting means between said brake rigging and the winding member comprising a chain attached to the winding member, said member being formed with a winding surface for the chain, the center line of which is in a single vertical plane and which is of such length that the brake rigging may be given substantially its maximum travel in less than one revolution of said member, gearing for revolving said winding member, a vertically disposed hand wheel for operating said gearing, and means for releasably holding said winding member in brake setting position and for retarding the reverse rotation thereof when released.

18. In combination with a railway car and its brake rigging, mechanism for manually operating said brake rigging comprising a bellcrank oscillating in a vertical plane on a fixed axis to which the brake rigging is attached and formed with a winding surface substantially concentric with the axis of the bellcrank upon which said operating chain is wound and with an arm outwardly projecting with respect to the car, a vertically arranged winding member above said bellcrank, connecting means between said bellcrank arm and winding member comprising a chain attached to the winding member and a rod attached to the bellcrank arm, said member being formed with a winding surface for the chain attached thereto, the center line of which is in a single vertical plane and which is of such a length that the brake rigging may be given substantially its maximum travel in less than one revolution of said member, the portion of which surface first engaged by the chain when the member is rotated in the brake setting direction being closer to the axis of said member than the remaining portion, a large gear in fixed relation with said winding member, a smaller gear meshing with said large gear, a horizontal shaft to which the small gear is fixed, and a hand wheel secured to said shaft.

19. Operating mechanism for railway car brakes, comprising means on the car body providing spaced supports, a bellcrank to which the brake rigging is attached, formed with a relatively wide hub pivotally mounted between said supports, the bellcrank arm being reinforced lengthwise of the hub at the juncture of the arm with said hub, whereby a hub of relatively small radius may be used without sacrificing strength of the bellcrank at the junction of the hub and bellcrank arm.

20. In combination with the brake rigging of a railway car, mechanism for operating the same comprising a bellcrank to which the brake rigging is attached and formed at one end with a curved surface, a winding member having an eccentric winding surface and connecting means between the bellcrank and winding surface having a sliding engagement with said curved surface of the bellcrank and comprising a chain attached to the winding member so as to first wind on the part of the winding surface of smaller radius when the apparatus is operated to set the brakes.

21. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane and having an outwardly extending arm connected with said tension member and having its relatively short arm connected to cooperate with means leading to the brake rigging, said train comprising means adapted to give an increasing curve of mechanical advantage, reaching substantially a maximum toward the end of the normal travel of the brake rigging, and a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage.

22. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane and having an outwardly extending arm with a slotted connection to said tension member and having its relatively short arm connected to cooperate with means leading to the brake rigging, said train comprising means adapted to give an increasing curve of mechanical advantage, reaching substantially a maximum toward the end of the normal travel of the brake rigging, and a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage.

23. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane about a fixed axis and having an outwardly extending arm connected with said tension member and having its relatively short arm connected to cooperate with means leading to the brake rigging, said train comprising means adapted to give an increasing curve of mechanical advantage, reaching substantially a maximum toward the end of the normal travel of the brake rigging, and a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage.

24. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane and having an outwardly extending arm connected with said tension member and having its relatively short arm connected to cooperate with means leading to the brake rigging, said winding member having an outer winding surface of sufficient circumferential length to assure substantially maximum travel for the brake rigging during one revolution of said winding member, said train comprising means adapted to give an increasing curve of mechanical advantage, reaching substantially a maximum toward the end of the normal travel of the brake rigging, and a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage.

25. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane and having an outwardly extending arm connected with said tension member and having its relatively short arm connected to cooperate with means leading to the brake rigging, said winding member having an outer winding surface substantially in a single vertical plane of sufficient circumferential length to assure substantially maximum travel for the brake rigging during one revolution of said winding member, said train comprising means adapted to give an increasing curve of mechanical advantage, reaching substantially a maximum toward the end of the normal travel of the brake rigging, and a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage.

26. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane and having an outwardly extending arm connected with said tension member and having its relatively short arm connected to cooperate with means leading to the brake rigging, said winding member having an outer winding surface eccentric to the axis of said winding member, said train comprising means adapted to give an increasing curve of mechanical advantage, reaching substantially a maximum toward the end of the normal travel of the brake rigging, and a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage.

27. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane and having an outwardly extending arm connected with said tension member and having its relatively short arm connected to cooperate with means leading to the brake rigging, said train comprising means adapted to give an increasing curve of mechanical advantage, reaching substantially a maximum toward the end of the normal travel of the brake rigging, a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage, and releasable means adapted to cooperate with the mechanism to prevent reverse movement thereof.

28. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane and having an outwardly extending arm connected with said tension member and having its relatively short arm connected to cooperate with means leading to the brake rigging, said train comprising means adapted to give an increasing curve of mechanical advantage, reaching substantially a maximum toward the end of the normal travel of the brake rigging, a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage, means for holding said winding member in brake setting position, and a lever adapted to release said last-mentioned means.

29. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane about a fixed axis and having an outwardly extending arm connected with said tension member and having its relatively short arm connected to cooperate with means leading to the brake rigging, said winding member having an outer winding surface of sufficient circumferential length to assure substantial maximum travel for the brake rigging during one revolution of said winding member, said train comprising means adapted to give an increasing curve of mechanical advantage, reaching substantially a maximum toward the end of the normal tavel of the brake rigging, a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage.

RICHARD W. BURNETT.

DISCLAIMER 2,054,651.—*Richard W. Burnett*, Chicago, Ill. HAND BRAKE MECHANISM. Patent dated September 15, 1936. Disclaimer filed April 12, 1943, by *Marie C. Burnett*, executrix of the estate of *Richard W. Burnett*.

Hereby enters this disclaimer to claims 1, 3, 4, 5, 7, 8, 9, 10, 11, 14, 15, 18, 19, 21, 23, 24, 25, 26, 27, 28, and 29 in said specification.

[*Official Gazette May 25, 1943.*]

by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage, and releasable means adapted to cooperate with the mechanism to prevent reverse movement thereof.

28. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane and having an outwardly extending arm connected with said tension member and having its relatively short arm connected to cooperate with means leading to the brake rigging, said train comprising means adapted to give an increasing curve of mechanical advantage, reaching substantially a maximum toward the end of the normal travel of the brake rigging, a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage, means for holding said winding member in brake setting position, and a lever adapted to release said last-mentioned means.

29. In hand braking apparatus for railway cars, in combination with the brake rigging, a power-transmitting train consisting of a pinion, a relatively large gear meshing with and driven from said pinion, a winding member driven from said gear, a tension member comprising a chain connected with and adapted to be wound upon said winding member and extending downwardly therefrom, and a bell crank lever mounted at the lower end of the car to swing in a vertical plane about a fixed axis and having an outwardly extending arm connected with said tension member and having its relatively short arm connected to cooperate with means leading to the brake rigging, said winding member having an outer winding surface of sufficient circumferential length to assure substantial maximum travel for the brake rigging during one revolution of said winding member, said train comprising means adapted to give an increasing curve of mechanical advantage, reaching substantially a maximum toward the end of the normal tavel of the brake rigging, a vertical hand wheel connected with said pinion and of a diameter and weight sufficient, upon being whirled by one hand of the brakeman, to utilize the increasing mechanical advantage and low frictional resistance of said train of elements to take up the slack and force the brake shoes against the wheels with a substantial pressure before said whirling movement stops, whereby a rapid take-up and substantial braking are quickly achieved and the parts placed in position for final application at high mechanical advantage.

RICHARD W. BURNETT.

DISCLAIMER 2,054,651.—*Richard W. Burnett*, Chicago, Ill. HAND BRAKE MECHANISM. Patent dated September 15, 1936. Disclaimer filed April 12, 1943, by *Marie C. Burnett*, executrix of the estate of *Richard W. Burnett*.

Hereby enters this disclaimer to claims 1, 3, 4, 5, 7, 8, 9, 10, 11, 14, 15, 18, 19, 21, 23, 24, 25, 26, 27, 28, and 29 in said specification.

[*Official Gazette May 25, 1943.*]

DISCLAIMER 2,054,651.—*Richard W. Burnett*, Chicago, Ill. HAND BRAKE MECHANISM. Patent dated September 15, 1936. Disclaimer filed April 12, 1943, by *Marie C. Burnett*, executrix of the estate of *Richard W. Burnett*.

Hereby enters this disclaimer to claims 1, 3, 4, 5, 7, 8, 9, 10, 11, 14, 15, 18, 19, 21, 23, 24, 25, 26, 27, 28, and 29 in said specification.

[*Official Gazette May 25, 1943.*]